United States Patent
Hathaway

(10) Patent No.: US 7,836,401 B2
(45) Date of Patent: Nov. 16, 2010

(54) USER OPERABLE HELP INFORMATION SYSTEM

(75) Inventor: Thomas W. Hathaway, Hopewell, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 2302 days.

(21) Appl. No.: 10/636,128

(22) Filed: Aug. 7, 2003

(65) Prior Publication Data

US 2004/0187082 A1 Sep. 23, 2004

Related U.S. Application Data

(60) Provisional application No. 60/456,305, filed on Mar. 20, 2003.

(51) Int. Cl.
*G06F 3/00* (2006.01)
*G06F 3/048* (2006.01)

(52) U.S. Cl. .............. 715/714; 715/705; 715/707; 715/708; 715/709; 715/710; 715/711; 715/712; 715/713

(58) Field of Classification Search .............. 715/705
See application file for complete search history.

(56) References Cited

U.S. PATENT DOCUMENTS

| | | | |
|---|---|---|---|
| 5,121,475 A * | 6/1992 | Child et al. ............... | 715/507 |
| 5,434,965 A * | 7/1995 | Matheny et al. ............ | 715/710 |
| 5,539,886 A * | 7/1996 | Aldred et al. .............. | 719/318 |
| 5,563,805 A * | 10/1996 | Arbuckle et al. ........... | 709/204 |
| 5,796,396 A * | 8/1998 | Rich ........................ | 715/741 |
| 6,035,264 A * | 3/2000 | Donaldson et al. ......... | 702/182 |
| 6,145,096 A * | 11/2000 | Bereiter et al. ............. | 714/25 |
| 6,199,061 B1 * | 3/2001 | Blewett et al. ............. | 707/3 |
| 6,259,445 B1 * | 7/2001 | Hennum et al. ............ | 715/709 |
| 6,314,449 B1 * | 11/2001 | Gallagher et al. .......... | 709/202 |
| 6,339,436 B1 | 1/2002 | Amro et al. | |
| 6,539,499 B1 * | 3/2003 | Stedman et al. ............ | 714/40 |
| 6,565,608 B1 | 5/2003 | Fein et al. | |
| 6,574,792 B1 * | 6/2003 | Easton ..................... | 717/142 |
| 6,594,697 B1 * | 7/2003 | Praitis et al. ............... | 709/225 |
| 6,615,240 B1 * | 9/2003 | Sullivan et al. ............ | 709/205 |
| 6,665,395 B1 * | 12/2003 | Busey et al. ............... | 379/265.09 |
| 6,728,761 B2 * | 4/2004 | Decime .................... | 709/217 |
| 6,836,801 B1 * | 12/2004 | Parrish et al. .............. | 709/224 |
| 6,856,268 B2 * | 2/2005 | Choi ........................ | 341/144 |
| 6,865,268 B1 * | 3/2005 | Matthews et al. .......... | 379/265.09 |
| 6,944,800 B2 * | 9/2005 | Brundridge et al. ........ | 714/48 |
| 6,959,294 B2 * | 10/2005 | Sullivan et al. ............ | 706/50 |
| 6,978,307 B2 * | 12/2005 | Goldstein .................. | 709/227 |
| 6,999,990 B1 * | 2/2006 | Sullivan et al. ............ | 709/205 |

(Continued)

FOREIGN PATENT DOCUMENTS

EP 0 380 491 B1 11/1994

*Primary Examiner*—Steven B Theriault
(74) *Attorney, Agent, or Firm*—Alexander J Burke

(57) ABSTRACT

Certain exemplary embodiments provide a system for providing help information supporting at least one executable application. The system can comprise an interface processor for receiving user-entered data representing a help message conveying help information, a creation time indicator identifying a creation time of the help message, and an identifier for identifying a help information repository associated with the help message. A data processor can store the help message in the help information repository in order of creation by using the creation time indicator.

29 Claims, 5 Drawing Sheets

U.S. PATENT DOCUMENTS

| | | | |
|---|---|---|---|
| 7,020,254 B2 * | 3/2006 | Phillips | 379/114.04 |
| 2001/0049722 A1 | 12/2001 | Bush | |
| 2003/0016238 A1 | 1/2003 | Sullivan et al. | |
| 2003/0030668 A1 | 2/2003 | Morrison | |
| 2003/0043180 A1 * | 3/2003 | Gusler et al. | 345/708 |
| 2003/0159088 A1 * | 8/2003 | Phillips et al. | 714/38 |
| 2003/0187672 A1 * | 10/2003 | Gibson et al. | 705/1 |
| 2004/0029567 A1 * | 2/2004 | Timmins et al. | 455/412.1 |
| 2004/0049547 A1 * | 3/2004 | Matthews et al. | 709/206 |
| 2004/0125149 A1 * | 7/2004 | Lapidous | 345/808 |
| 2004/0131081 A1 * | 7/2004 | Bhatia et al. | 370/466 |
| 2004/0139156 A1 * | 7/2004 | Matthews et al. | 709/204 |
| 2004/0236843 A1 * | 11/2004 | Wing et al. | 709/219 |
| 2005/0081188 A1 * | 4/2005 | Kumar et al. | 717/102 |
| 2005/0182783 A1 * | 8/2005 | Vadai et al. | 707/102 |
| 2005/0193036 A1 * | 9/2005 | Phillips et al. | 707/202 |

* cited by examiner

USER OPERABLE HELP INFORMATION SYSTEM

CROSS-REFERENCE TO RELATED APPLICATIONS

This application claims priority to pending U.S. Provisional Patent Application Ser. No. 60/456,305, filed Mar. 20, 2003.

BACKGROUND

Most computer-based help systems are static software packages authored by a vendor. Some computer-based help systems monitor user activity in order to provide more relevant help related to a particular operation, however the help provided is typically limited to standard vendor-authored information. Furthermore, the available help content is often not sufficiently specific to a problem encountered by a user. Some help systems allow the user to add customized content to the existing help system or modify existing content, however these systems require special links and/or complicated and/or numerous steps to add custom help information to an existing help system. Such systems employ the framework of the existing help application.

Moreover, existing help systems do not allow custom content to be time sensitive, wherein the custom content can be sorted according to its creation time and deleted after a certain period or at a certain time. Other help systems do not provide a help data structure that supports dynamic and time-sensitive help content that is contributed by a group of users in support of a group activity. A system according to the principles of the invention addresses the identified deficiencies and associated problems.

SUMMARY

Certain exemplary embodiments provide a system for providing help information supporting at least one executable application. The system can comprise an interface processor for receiving user-entered data representing a help message conveying help information, a creation time indicator identifying a creation time of the help message, and an identifier for identifying a help information repository associated with the help message. A data processor can store the help message in the help information repository in order of creation by using the creation time indicator.

BRIEF DESCRIPTION OF THE DRAWINGS

A wide array of potential embodiments can be better understood through the following detailed description and the accompanying drawings in which.

DETAILED DESCRIPTION

Figure 1:
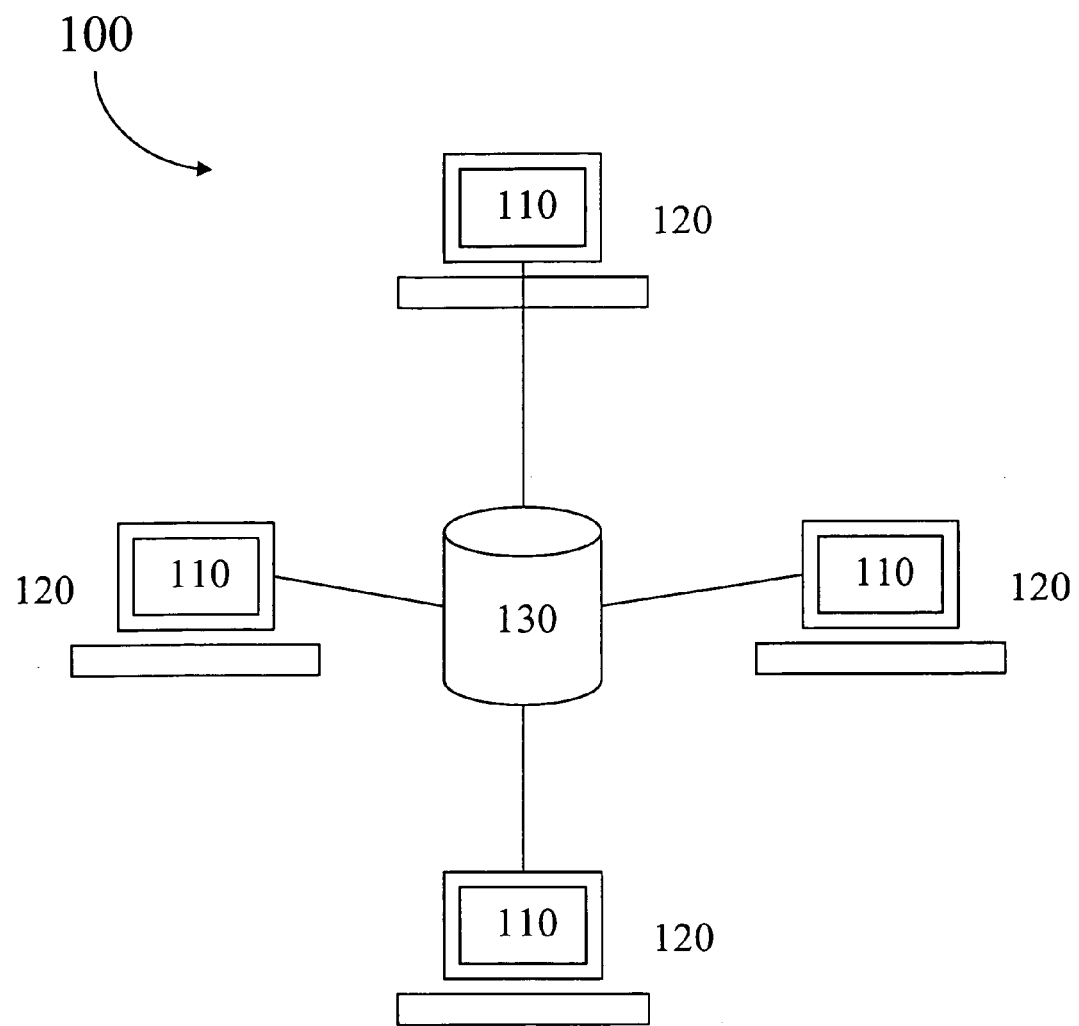
FIG. 1 is an exemplary embodiment of a system for a user-editable help application.

Certain exemplary embodiments comprise a system and/or method for providing help information in support of an operation. As used herein, "operation" refers to any task that can be aided by computer-rendered help information, such as for example, how to serve a volleyball, how to prepare a cherry cheesecake, how to create a macro in Excel, and/or how to complete a field in a form or database, etc. Thus, in certain scenarios, an operation can relate to a computer application, computer program, executable application, and/or any equivalents thereof. An operation can comprise one or more sub-operations, tasks, functions, actions, activities, and/or any equivalents thereof that are conducted entirely, partially, or not at all via a computer or computer network.

As used herein, "help information" refers to any information related to an operation. When help information regarding a particular operation is desired, a user can access a user-editable help application. As used herein, "user" refers to any entity that can access and potentially utilize help information, including an individual, a vendor, an organization, a company, and/or any equivalents thereof, etc. As used herein, a "user-editable help application" refers to a mechanism whereby a user's actions or inputs can be recorded in the form of a user-editable help log accessible by the user-editable help application and potentially sequentially rendered to users of the user-editable help application. As used herein, the term "input" refers to any content submitted by a user for posting via a user-editable help application. As used herein, "to render" means to make information perceptible to one or more users. Information can be rendered directly to the brain and/or via any sensory organ, and thus can involve audio, visual, tactile, and/or olfactory means.

Certain exemplary embodiments of a user-editable help application can incorporate the functionality of a "web log", which as used herein refers to a mechanism for receiving user inputs and rendering the information contained in the inputs to one or more users. The information comprised by a web log can be continuously updated as various users add or delete input. A web log can be utilized as part of a community sharing network that can display the most recent user-submitted content first while maintaining accessibility to older content. An example of a web log can be found on the web at slashdot.com. Users can access a web log over a network, intranet, and/or internet, thus a web log potentially allows real-time communication irrespective of large distances between users.

Certain exemplary embodiments of a user-editable help application can render inputs received from various users related to a particular operation. Input successfully submitted to a user-editable help application can appear as a help message. A series of help messages can form a help log, repository of help messages, journal, bulletin board, and/or any equivalents thereof, etc. A help message can also be described as a log entry, a posting, a listing, an entry, an input, and/or any equivalents thereof, etc. A help message can provide information regarding the status of a particular operation or answer a question submitted by another user.

An exemplary embodiment of a user-editable help application can comprise a help log with a series of help messages, each of which having a related indicator of the time (e.g., the clock time and/or calendar date) of the submission of the help message and each of which having a related indicator of the user who submitted the help message. The user-editable help application can also contain function links to general instructions, procedures, and/or policies regarding a particular operation. As used herein, "function link" refers to a link on a page that allows a user to access a particular function by activating the function link through an action such as a keyboard stroke or mouse click. Activation of a function link can occur through a "single action", which as used herein refers to any single act that can activate a function, such as a mouse click, a mouseover, a keyboard stroke, a pen stroke, a finger stroke or signal, a voice signal, staring at a predetermined screen location for a predetermined time, and/or any equivalents thereof. Other exemplary embodiments of a user-editable help application can comprise information such as general instructions, procedures, and/or policies with a list of submitted user help messages. User-submitted help messages and/or other inputs can be entered, stored, and/or rendered in a creation time-ordered sequence. In an exemplary embodiment, the most recently created input can be listed as the first help message on the help log. Alternatively, one or more users, such as those having specific privileges, can specify that certain user-submitted help messages or other inputs be prioritized to always be displayed first, second, third, etc., last, or in any other predetermined position in the list.

FIG. 1 is an exemplary embodiment of a system 100 for a user-editable help application 110. User-editable help application 110 can be accessed through any appropriate access terminal 120, including a desktop computer, a computer terminal, a workstation, a minicomputer, a mainframe computer, a laptop computer, a portable handheld device, a personal digital assistant (PDA), a telephone, a cellular telephone, a mobile telephone, and/or any equivalents thereof, etc. User-editable help application 110 can be unique to a particular navigation document, web document, browser document, Internet document, intranet document, document, file, program, application, operation, and/or any equivalents thereof, etc. User-editable help application 110 can be accessed from a document, file, program, application, desktop, keyboard key, mouse action, telephone keypad, and/or any type of computer and/or telecommunications tool. User-editable help application 110 can comprise a user interface for receiving user inputs. The content of submitted user input can be rendered via the user-editable help application 110 as a help message in a help log.

A database 130 can manage, cooperate with, be utilized by, and/or utilize user-editable help application 110. Database 130 can be connected to access terminals 120 by any known means, including an unwired connection (e.g., "wireless", RF, microwave, laser, optical fiber, etc.), a wired connection (e.g., twisted pair wire, coaxial cable, optical fiber, etc.), a network (e.g., public, private, circuit-switched, packet-switched, virtual, radio, telephone, cellular, cable, DSL, satellite, microwave, AC power, LAN, WAN, Internet, intranet, wireless, Wi-Fi, BlueTooth, Airport, 802.11a, 802.11b, 802.11g, etc.), and/or any equivalents thereof, etc. Alternatively, database 130 can be bundled with access terminal 120 and/or any operation linked to user-editable help application 110. As users at different access terminals 120 add input to user-editable help application 110, database 130 can process and integrate the various inputs and update user-editable help application 110 to reflect recent entries. An interface processor can be incorporated into database 130 to process incoming messages. Alternatively, an interface processor can serve an intermediary function between user editable help application 110 and database 130. The user interface of a particular user-editable help application 110 can be associated with a corresponding database 130 that serves as a repository of help messages for a particular operation.

Database 130 can be programmed to limit access to user-editable help application 110. Alternatively, certain exemplary embodiments of database 130 can allow access by an administrator to manage the inputs submitted to user-editable help application 110. Thus, various forms of password protection can be used to view or enter help messages and/or to access administrator control features in user-editable help application 110. An exemplary embodiment of database 130 can automatically delete inappropriate help messages to user-editable help application 110. Older or obsolete help messages can also be automatically deleted.

Exemplary embodiments of database 130 can be located on a server separate from access terminal 120. User-editable help application 110 and/or the operation linked to user-editable help application can also be located on a server or any other appropriate hardware separate and/or remote from access terminal 120.

Figure 2:
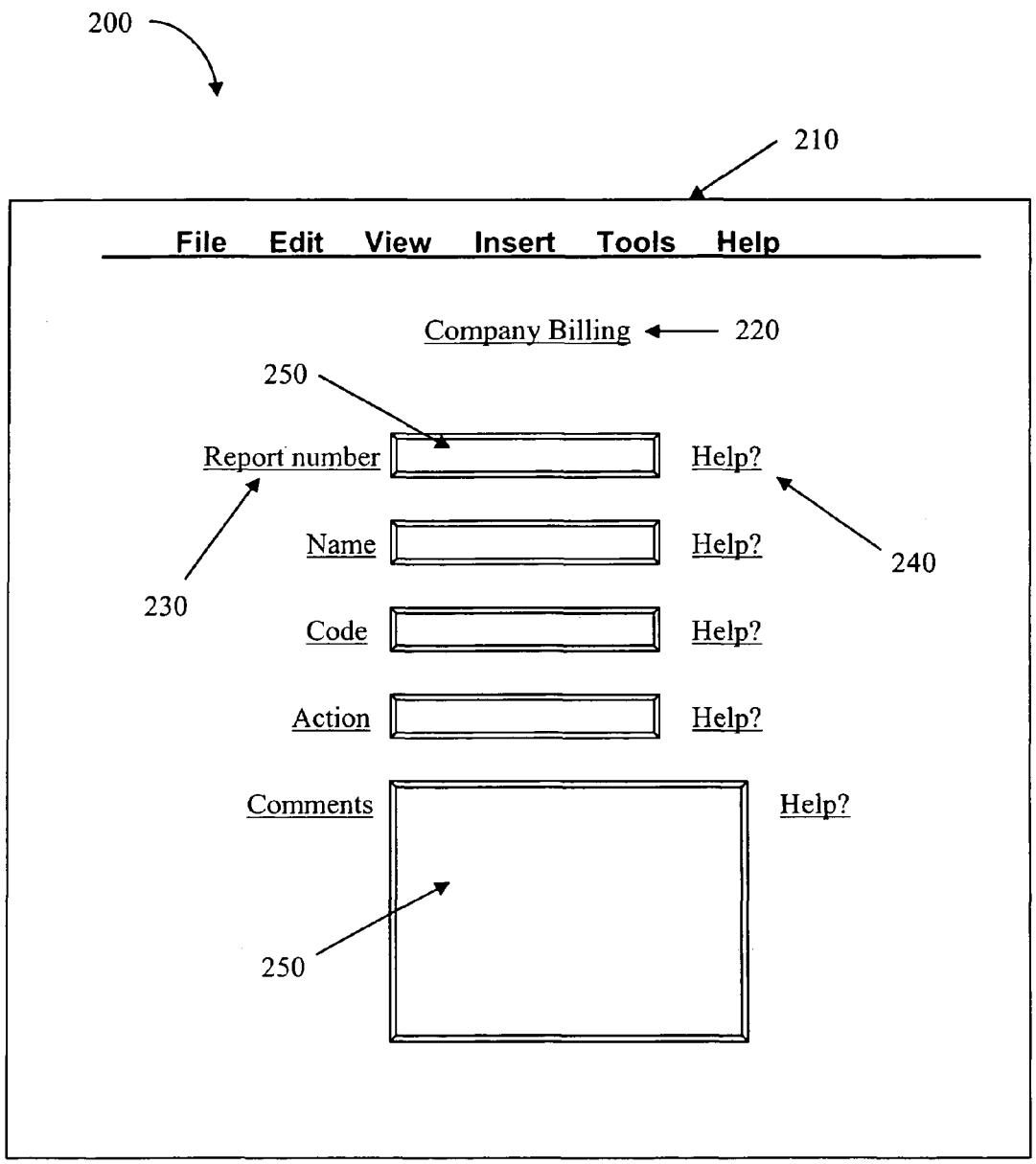
FIG. 2 is an exemplary embodiment of a user interface of an operation associated with a user-editable help application.

FIG. 2 is an exemplary embodiment of a user interface 200 of an operation associated with a user-editable help application. The operation can comprise a task 220 related to a procedure of a company or organization, such as billing. A user-editable help application can be available for the entire task 220 and/or various subtasks 230 (e.g., providing a report number, name, code, comments, etc.) associated with fields 250 of an underlying database associated with task 220. A user-editable help application can be accessed through a navigation menu 210 and/or by selecting function links associated with the task 220, subtasks 230, and/or separate "Help?" function links 240. A link indicating access to a user-editable help application can use any term or symbol for help, such as "Help", "?", "Information", "Questions", and/or any equivalents thereof. A function link can include an indication, such as underlining, highlighting, and/or a predetermined color, font, typestyle, etc. that the function link can provide access to a user-editable help application via a single action.

Figure 3:
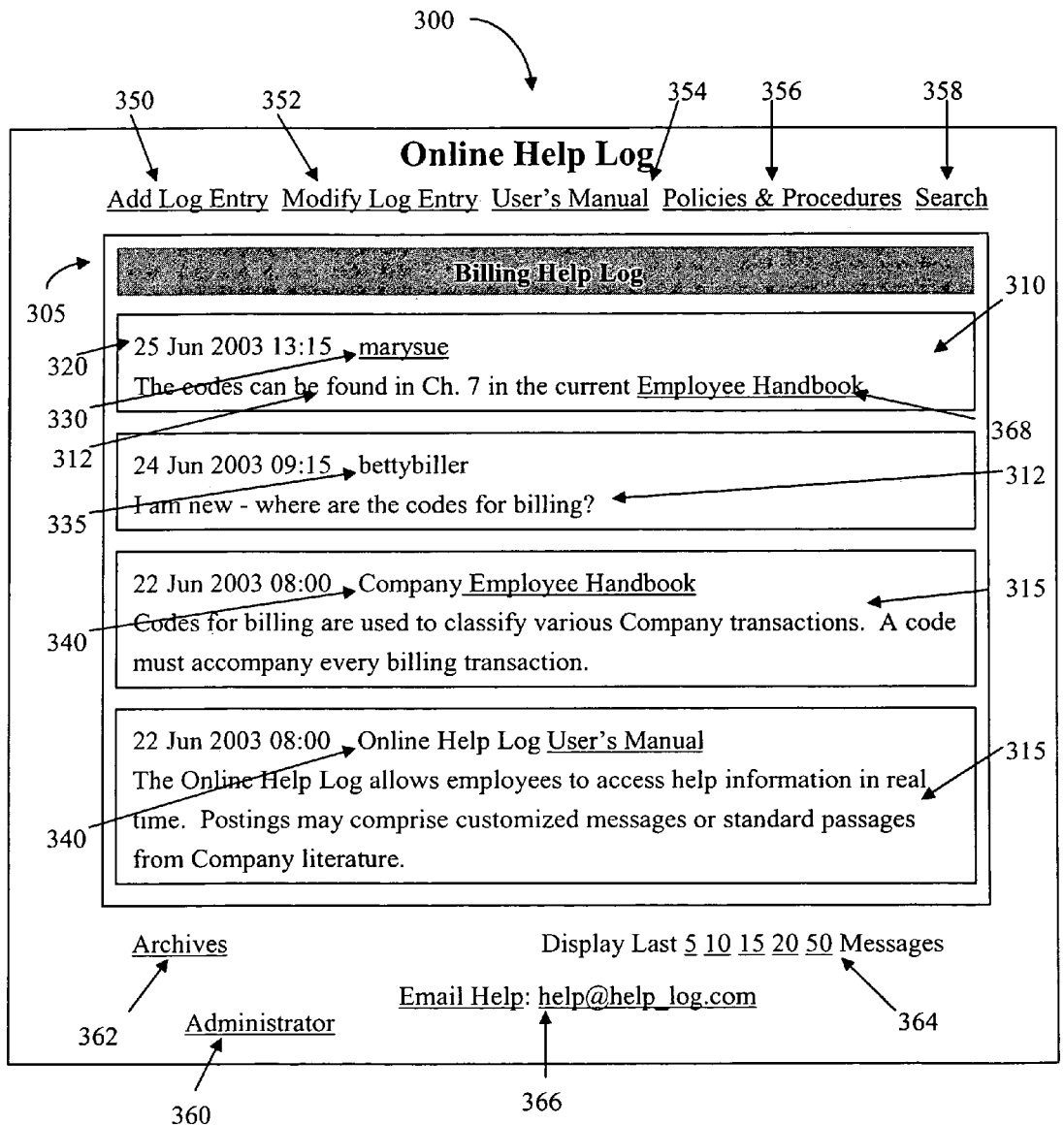
FIG. 3 is an exemplary embodiment of a user-editable help application.

FIG. 3 is an exemplary embodiment of a user-editable help application 300. User-editable help application 300 can be accessed through a single action by a user, such as clicking once on a link or button on a navigation page. Clicking on a function link within a computer operation can cause user-editable help application 300 to appear as a window comprising a help log 305. Thus, through a single action a user can be provided with specific help information for an operation or a subtask contained therein.

Help log 305 can comprise one or more sequential help messages 310 that can be ordered by time and/or date of creation. A user-defined help message 312 can be provided and/or posted by a user. An organization help message 315 can be posted by a vendor, administrator, company, organization, and/or any equivalents thereof and can comprise official policies or procedures related to a particular operation. An exemplary embodiment of help log 305 can have its own scroll bar (not shown). Alternatively, a user can read multiple messages by utilizing a scroll bar for user-editable help application 300. Certain exemplary embodiments of user-editable help application 300 can also comprise function links 350, 352, 354, 356, 358, 360, 362, 364, 366, 368 which can activate various functions (described below) related to user-editable help application 300.

Help messages 310 can be sorted according to the order that they are received and/or created. The creation time of help message 310 can comprise the time of receipt of the help message 310 by an interface processor associated with a database, a time of incorporation and/or processing of help message 310 by the database and/or interface processor, a time associated with the input of help message 310 by a user, a time associated with the communication of help message 310 to the database and/or associated repository, and/or the time associated with the receipt of help message 310 by the database and/or associated repository. A data processor incorporated into or distinct from an associated database and/or repository can store the information contained within help message 310 along with an indicator identifying the user interface image associated with help message 310 and employed by user-editable help application 300, a repository section identifier, a database section identifier, a sequence number identifying a message sequence within a repository or database section, a help message 310 creation time or date indicator, information identifying a user who created or modified help message 310, and/or a time or date indicator indicating an expiration of help message 310.

User-defined help messages 312 can comprise or be related to an associated date indicator 320, which can show the clock time and/or calendar date of an input, submission, posting, etc. User-defined help messages 312 can also comprise a user identifier 330, 335. User identifier 330 can have an e-mail link to the posting user or to information regarding the posting user. A user identifier 330 that is underlined or highlighted can signify a function link whereas a user identifier 335 without a textual distinction can have no function link.

Certain exemplary embodiments of help log 305 can comprise organization help messages 315. Organization help messages 315 can comprise general help information and/or specific help information for a particular operation, general policy information and/or specific policy information for a particular operation, general procedure information and/or specific procedure information for a particular operation, and/or any equivalents thereof. An exemplary embodiment of vendor and/or organization input 315 can comprise a time indicator 320 and/or a source identifier 340.

In certain exemplary embodiments of user-editable help application 300, function links 350, 352, 354, 356, 358, 360, 362, 364, 366, 368 can be distinguished, for instance by a particular color, highlighting, font, text style, underlying or otherwise to signify a link to a function or action. User-editable help application 300 can comprise any number of function links. Function links can be placed in any location in user-editable help application 300. For example, a function link can be placed within user-defined help message 312 where a user can post help information along with a user-inserted function link 368 related to the help information. As another example, a function link can be placed anywhere in or on a user interface for user-editable help application 300.

For example, user-editable help application 300 can comprise an "Add Log Entry" function link 350. Add Log Entry function link 350 can comprise a function link to a text box where a user can input content related to a particular operation. A user can input content to user-editable help application 300 through any means, including a keyboard, a touchpad, a mouse, voice recognition, a stylus, and/or any equivalents thereof, etc. A "Modify Log Entry" function link 352 can allow a user to modify and/or delete a previous input to user-editable help application 300.

An exemplary embodiment of user-editable help application 300 can comprise a "User's Manual" function link 354. Activation of User's Manual function link 354 can allow access to a display comprising instructions regarding user-editable help application 300. Alternatively, User's Manual function link 354 could allow a single action connection to a navigation tool to various entries or sections within help log 305. User-editable help application 300 can also comprise "Local Policies & Procedures" function link 356, which can allow a user to view policies and procedures related to user-editable help application 300.

Certain exemplary embodiments of user-editable help application 300 can comprise a "Search" function link 358, which can allow access to various search operations. Exemplary embodiments of a search operation can allow searching of user-editable help applications 300, help messages 310, User's Manuals 354, and/or Local Policies and Procedures 356, etc. A Search function link 358 can allow searching according to various parameters, including topic, subject matter, user identity, user type, time, clock time, calendar date, operation, content found in standard organization manuals, policies and/or procedures, new, modified, or deleted help messages, and/or any equivalents thereof.

Certain exemplary embodiments of user-editable help application 300 can comprise an "Administrator" function link 360. Administrator function link 360 can allow an administrator to edit or modify any feature of user-editable help application 300 through various administrator controls. Exemplary embodiments of administrator controls can allow an administrator to access to a database in order to modify any feature of user-editable help application 300.

Certain exemplary embodiments of user-editable help application 300 can comprise an "Archives" function link 362, which can allow a user to access previous help messages (not shown) and/or help logs (not shown) for expired help messages. User-editable help application 300 can also comprise a "Display Messages" function link, wherein a user can alter which help messages are displayed in help log 305 at a given time. Certain exemplary embodiments of user-editable help application can always display organization help messages 315 so that a user does not have to search archives or scroll down to read standard information. A user can directly email a help question to an administrator or organization through "Email Help" function link 366.

Certain exemplary embodiments of user help application 300 can allow content to be directly submitted from a user's manual, employee handbook, guidelines, policies and procedures, and/or any equivalents thereof to the appropriate user-editable help application 300. Thus, a user's manual can be accessed through User's Manual function link 354 and a page or section from within the user's manual can have the capability to be submitted directly to user-editable help application. Once the section of the user's manual has been accessed, it can be sent in a single action to a database for integration and display within help log 305

Figure 4:
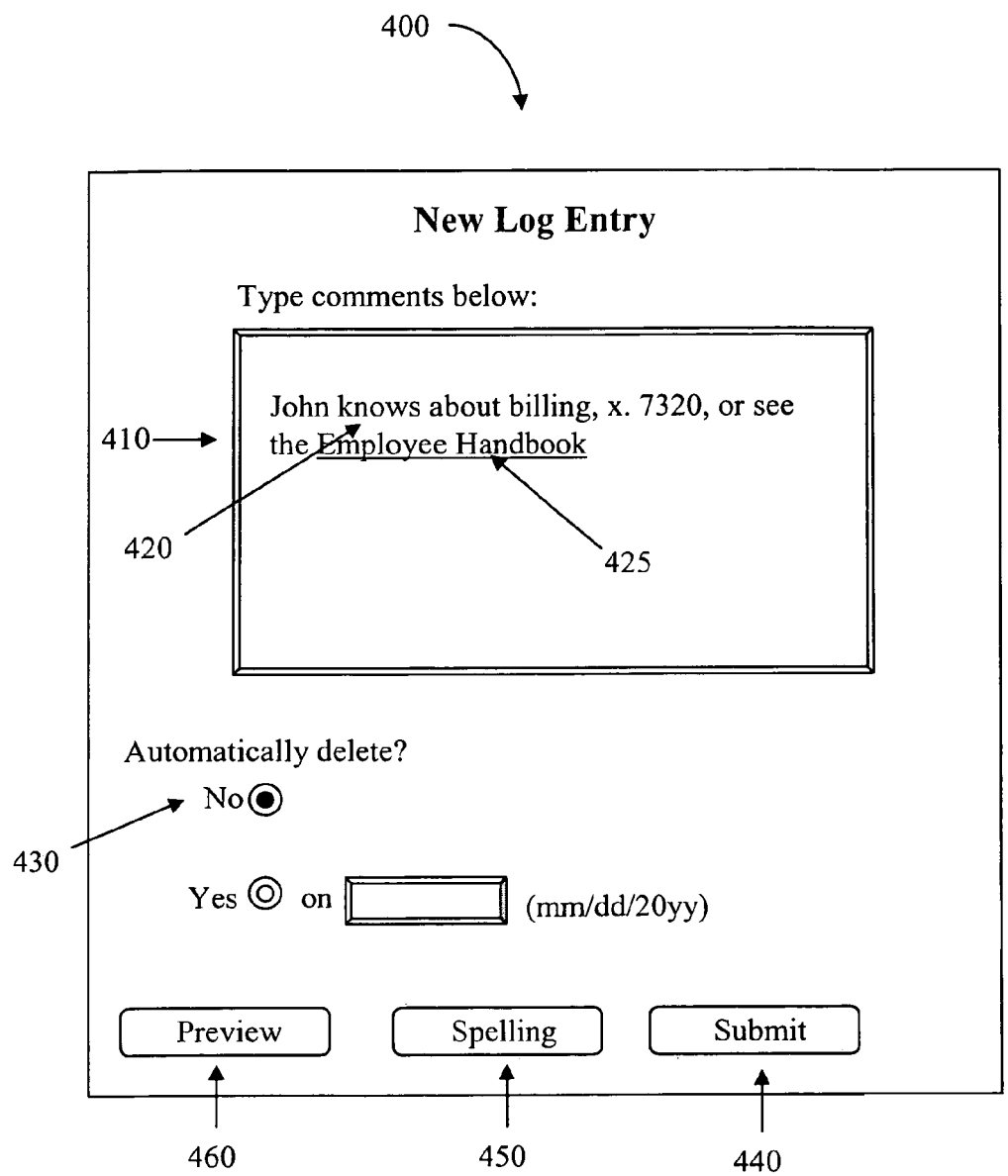
FIG. 4 is an exemplary embodiment of a user interface for a function link within a user-editable help application.

FIG. 4 is an exemplary embodiment of a user interface for a function link within a user-editable help application. After a user has accessed a user-editable help application, a window 400 comprising a text box 410 for inputting a message can be accessed by clicking once on the appropriate function link. A help message 420 can be inputted into text box 410. Help message 420 can then be submitted to a database for integration and posting on a user-editable help application. Help message 420 can comprise a user-inserted function link 425 to an information source such as an employee manual. Certain exemplary embodiments of window 410 can have the ability to recognize certain terms as they are written, such as email addresses or information sources, and automatically convert the plain text into user-inserted function link 425. Thus, if a user typed "That information can be found in the Employee Manual", the phrase "Employee Manual" can be recognized and a link automatically provided from that phrase to the Employee Manual.

In certain exemplary embodiments, a user can designate that a help message is deleted after a certain date through parameter 430. Certain exemplary embodiments of window 400 can comprise additional parameters for help message 420.

Certain exemplary embodiments of a window 400 can comprise a "Submit" button 440. A single action by a user, such as clicking on Submit button 440, can send help message 420 and close window 400. A separate dialog box can appear giving a confirmation of a successful submission or a message indicating an error with the submission. Other exemplary embodiments of a user-editable help application can allow a record to be created within a database via the first single action of clicking on an appropriate function link. Thus in an exemplary embodiment, as text is added to text box 410, each keystroke of the user and the resulting input rendered in the textbox can be automatically and instantly posted to the database.

Certain exemplary embodiments of window 400 can comprise additional features. A user can spell check help message 420 by clicking once on a Spelling button 450, and/or spell-checking can be automatically invoked while a help message is created and/or once it is created. Any other common functions associated with editing text, such as a grammar checker, thesaurus, and/or language translator can be incorporated into window 400. A user can also preview help message 420 before it is submitted to a database for display within a help log automatically and/or by clicking once on a Preview button 460. A preview can show a user how help message 420 will appear when it is actually displayed within the help log.

Figure 5:
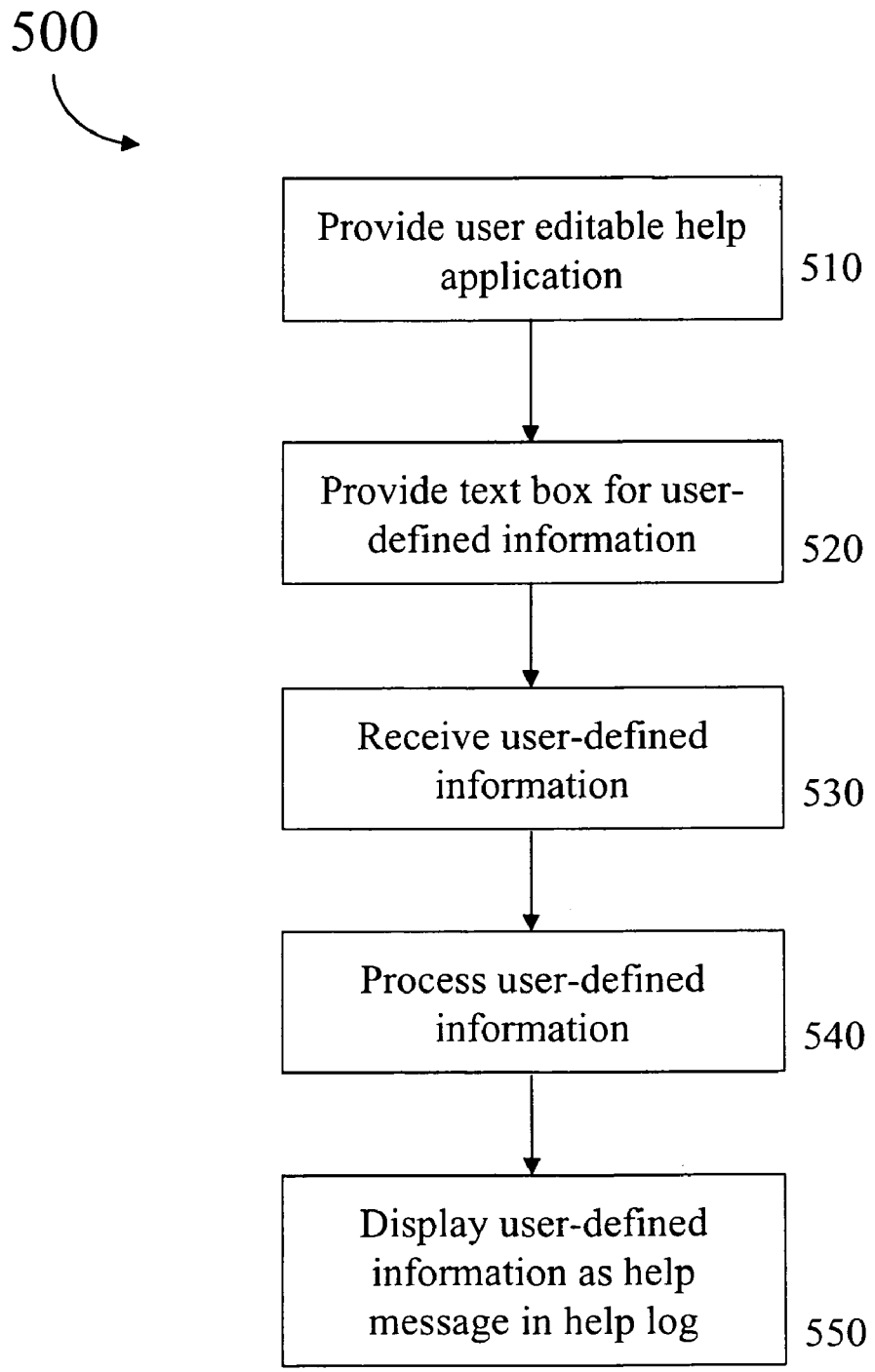
FIG. 5 is a flow chart of an exemplary embodiment of a method for operating a user-editable help application.

FIG. 5 is a flow chart of an exemplary embodiment of a method 500 for operating a user-editable help application. At activity 510, in response to a user request, a user-editable help application linked to an operation can be provided. The means of access to the user-editable help application can be through any means, such as a hyperlink, an icon, a menu bar, a button, a URL, and/or any equivalents thereof, etc. Activating the appropriate link can enable a command processor to receive a request for help information and retrieve relevant help information from an associated help repository and/or database. A display generator can then display the relevant images. A user-editable help application can be designed to assist with an entire operation and/or a particular portion of an operation, such as assisting with a window, navigation page, database entry screen, menu bar, form, icon, disclaimer, subfiles, and/or subprograms, etc. Alternatively, a user-editable help application can be designed for use with a subtask within an operation, such as an individual field within a form. The command processor can retrieve a request for help information related to multiple operations. A request can comprise an identifier to identify which user interface display is required for the particular operation requiring assistance.

At activity 520, a means for creating, importing, providing, inputting and/or rendering user-defined information can be provided. The means for inputting can include word processing tools for textual information, such as a window, text box, dialog box, icon, radio button, check box, menu; graphics tools for items such as a photograph, illustration, graphic, drawing, painting, chart, graph, table, animation, etc.; audio recording and/or playback tools; video recording and/or playback tools; hyperlinking tools; etc. A user can create content for input to the user-editable help application. Content can comprise any means of communicating information. Content inputted to a user-editable help application can be unique messages composed and/or provided by one or more users. Alternatively, content can be standard information, policies, or procedures that a user chooses to submit to a user-editable help system. Content can include organization and/or employee information.

Any images presented to a user as part of a user-editable help application can comprise instructions for the use of various functions present within the image. Instructions can be provided through text, links, audio messages, balloons, and/or any equivalents thereof, etc.

At activity 530, user-defined information can be received. A user can submit content by typing in a message and pressing a submit button. Prior to submission, a user could run a spell checker and/or grammar checker, use a thesaurus, translate a word (such as to a different language), and/or preview a potential message by using certain features contained within the means for importing user-defined information. For example, a user could enter a text message in a text box, activate a spell check function, and then submit the message.

At activity 540, a database can process an input. Exemplary embodiments of a database can catalog and/or index an input according to any of various characteristics, including subject, content of input, time, clock time, and/or calendar date of input, the location within an operation where a user-editable help application was accessed, expiration date of the input, access terminal from where an input was received, sequence number within a series of inputs, user identity, and/or type of user, etc. At activity 550, a database can then display the content of the user input as a help message in a help log within the user-editable help application. The help message can comprise user-defined information, organization information, employee information, policy information, and/or procedure information.

Certain exemplary embodiments of a user-editable help application can have a minimum number of steps for a user to access and edit help information. A user can view a user-editable help application comprising a help log via a single action, call up a function within the user-editable help application, such as Add Log Entry, via a single action, generate a help message, and then submit that help message via a single action.

Exemplary embodiments of a user-editable help application can allow various users to contribute to a user-editable help application. The use of a network can remove distance as a barrier to communication. A user-editable help application can be used for operations where several users are cooperatively acting to complete an operation over a period of hours or days. For certain operations that are time sensitive and require access to organization policies and procedures, such as the close of an accounting period, various users can contribute information to a user-editable help log while having access to specific policies and procedures related to the operation. Exemplary embodiments of a user-editable help log can be applied to any industry or business purpose. Other exemplary embodiments can be adapted for noncommercial use with programs and operations for the home.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive.

What is claimed is:

1. A system for providing help information supporting user operation of at least one executable application, comprising:
   an interface processor for receiving:

user entered data representing a help message conveying help information addressing a recorded problem encountered in using at least one executable application by providing information for eliminating or reducing said problem, a creation time indicator identifying a creation time of said help message; and an identifier for identifying a help information repository associated with said help message;

a user interface providing a display image including a help message and enabling a user to retrieve an additional document associated with a particular help message from said help information repository; and a data processor for storing said help message conveying help information in said help information repository in order of creation by using said creation time indicator wherein said data processor automatically parses a help message and creates a link for retrieving said additional document by converting text into a hyperlink and inserting said hyperlink in a help message and said data processor automatically deletes said help message after expiration of a time period from a creation time.

2. The system according to claim 1, wherein said display image includes a link representative item enabling a user to retrieve said additional document and enables a user to retrieve help message information from said help information repository sorted by creation time using a creation time indicator and said interface processor comprises a search operation, said search operation allows a user to search help information repository.

3. A system according to claim 1, wherein said creation time indicator includes a creation date indicator and said data processor stores said message conveying help information in said help information repository in order of creation by using said creation time and date indicator.

4. A system according to claim 1, wherein said interface processor receives said help message in response to user entry of said data representing said help message using a help window generated in response to user selection of a help icon presented in a displayed user interface image employed by said executable application and said help information repository comprises records of help messages associated with at least one of: (a) said displayed user interface image and (b) an image element in said displayed user interface image.

5. A system according to claim 1, wherein individual displayed user interface images employed by said executable application are associated with corresponding individual information repositories comprising records of help messages concerning a corresponding displayed user interface image.

6. A system according to claim 1, wherein said help information repository associated with said help message comprises at least one of: (a) a web page, (b) a journal, (c) a database, (d) a record and (e) a system, of help information and said help information repository is accessible by users of said executable application.

7. A system according to claim 1, wherein said creation time of said help message comprises at least one of (a) a time associated with receipt of said help message by said interface processor in response to user data entry, (b) a time associated with incorporation of said help message in said help information repository, (c) a time associated with entry of said help message by a user, (d) a time associated with communication of said help message to said help information repository and (e) a time associated with receipt of said help message by said help information repository.

8. A system according to claim 1, wherein said data processor stores said help message conveying help information in said help information repository together with at least one of: (a) an indicator identifying a displayed user interface image associated with said help message, said user interface image being employed by said executable application, (b) a repository section identifier, (c) a sequence number identifying a message sequence within a repository section, (c) a help message creation time or date indicator, (d) information identifying a user creating or updating said help message, (e) a time or date indicator indicating expiration of validity of said help message.

9. A system according to claim 6, wherein said repository section identifier identifies that said help message is to be stored in a repository section comprising at least one of (a) a repository section accessible to all users, (b) a repository section accessible to an administrator, (c) a repository section accessible to an organization operating said executable application and (d) a repository section accessible to an organization owning said executable application.

10. A system according to claim 6, wherein said interface processor receives said at least one indicator (a) to (e).

11. A system according to claim 9, wherein said data processor stores said message conveying help information in said section identified by said section indicator.

12. A system according to claim 10, wherein said section comprises at least one of: (a) a section accessible to all users and (b) a section accessible by particular user and concerning policies and procedures.

13. A system for providing help information supporting user operation of at least one executable application, comprising:

an interface processor for receiving:

user entered data representing a message conveying help information addressing a recorded problem encountered in using at least one executable application by providing information for eliminating or reducing said problem;

a creation time indicator identifying a creation time of said help message;

an identifier for identifying a help information repository associated with said help message, and a section indicator identifying a section of said help information repository associated with said help message and said interface processor initiates searching of said help information repository to identify help messages in response to user command;

a user interface providing a display image presenting identified help messages ranked according to creation time and including a particular help message and a user selectable link enabling a user to retrieve an additional document associated with a particular help message from said help information repository; and a data processor for storing said help message conveying help information in said help information repository in an order of creation using said creation time indicator wherein said interface processor automatically parses a help message and creates a link for retrieving said additional document by converting text into a hyperlink and inserting said hyperlink in a help message and said image presents messages conveying help information in time order of creation with a most recently created message being presented first.

14. A system for providing help information supporting user operation of at least one executable application, comprising:

a command processor for:

receiving a request to access help information addressing a recorded problem encountered in using at least one executable application by providing information for eliminating or reducing said problem and including an indicator identifying a particular user interface display image employed by said at least one executable application and associated with said help information request, retrieving help information from a repository in response to said request; and a display generator for initiating display of at least one image in response to said request, said at least one image including messages conveying help information in a time order of creation and associated with said displayed user interface image employed by said executable application and enabling a user to retrieve an additional document associated with a particular help message from said help information repository wherein said command processor automatically parses a help message and creates a link for retrieving said additional document by converting text into a hyperlink and inserting said hyperlink in a help message and said at least one image presents messages conveying help information in time order of creation with a most recently created message being presented first.

15. A system according to claim 14, wherein said display image includes a link representative item enabling a user to retrieve said additional document and enables a user to retrieve help message information from said help information repository sorted in time order of creation and said command processor receives a request to access help information supporting user operation of multiple executable applications and including an indicator identifying a particular user interface display image of a particular executable application.

16. A system according to claim 14, wherein said time order of creation of said message comprises an order based on at least one of: (a) a time associated with receipt of said message by said interface processor in response to user data entry, (b) a time associated with incorporation of said message in said repository, (c) a time associated with entry of said message by a user, (d) a time associated with communication of said message to said repository and (e) a time associated with receipt of said message by said repository.

17. A system according to claim 14, wherein said command processor automatically parses a help message and creates a link for retrieving said additional document by converting text into a hyperlink and inserting said hyperlink in a help message and said at least one image presents messages conveying help information in time order of creation with a most recently created message being presented first.

18. A system according to claim 14, wherein said at least one image includes instructions guiding a user in use of functions available in said image.

19. A system for providing help information supporting user operation of at least one executable application, comprising:

a display generator for initiating display of at least one help access image in response to user selection of a help icon associated with a user interface image employed by said executable application, said help access image including an image element enabling a user to at least one of:

(a) add a message to a help information repository, (b) access user manual information associated with said user interface image employed by said executable application, (c) read information derived from said help information repository including messages conveying help information addressing a recorded problem encountered in using said executable application by providing information for eliminating or reducing said problem in a time order of creation and associated with said user interface image employed by said executable application, and (d) retrieve an additional document associated with a particular help message from a help information repository; and a command processor for initiating access to said help information repository in response to user activation of said image element and for automatically parsing a help message and creating a link for retrieving said additional document by converting text into a hyperlink and inserting said hyperlink in a help message and for providing a search function.

20. A method for providing help information supporting user operation of at least one executable application, comprising the activities of:

receiving:

(a) user entered data representing a message conveying help information addressing a recorded problem encountered in using said executable application by providing information for eliminating or reducing said problem, (b) an indicator identifying a creation time of said message, (c) an identifier for identifying a help information repository associated with said message;

providing a display image including a help message and enabling a user to retrieve an additional document associated with a particular help message from said help information repository;

storing said help message conveying help information in said help information repository in order of creation by using said indicator; and automatically parsing a help message and creating a link for retrieving said additional document by converting text into a hyperlink and inserting said hyperlink in a help message; and providing a search function.

21. A method for providing help information supporting user operation of at least one executable application, comprising the activities of:

receiving a request to access help information addressing a recorded problem encountered in using said executable application by providing information for eliminating or reducing said problem and including an indicator identifying a particular user interface display image employed by said executable application and associated with said request;

retrieving help information from a repository in response to said request;

initiating display of at least one image in response to said request, said at least one image including messages conveying help information in a time order of creation and associated with said user interface display image employed by said executable application and enabling a user to retrieve an additional document associated with a particular help message from said help information repository; and automatically parsing a help creating a link for retrieving said additional document by converting text into a hyperlink and inserting said hyperlink in a help message; and providing a search function.

22. A method for providing help information supporting user operation of at least one executable application, comprising the activities of:

initiating display of at least one help access image in response to user selection of a help icon associated with a user interface image employed by said executable application, said help access image including an image element enabling a user to at least one of (a) add a message to a help information repository, (b) access user manual information associated with said user interface image employed by said executable application, (c) read information derived from said help information repository including messages conveying help information addressing a recorded problem encountered in using said executable application by providing information for eliminating or reducing said problem in a time order of creation and associated with said user interface image employed by said executable application, and (d) retrieve an additional document associated with a particular help message from a help information repository;

initiating access to said help information repository in response to user activation of said image element; and automatically parsing a help message and creating a link for retrieving said additional document by converting text into a hyperlink and inserting said hyperlink in a help message; and providing a search function.

23. A method, comprising the activities of:

in response to a first single action, presenting a help log comprised by a user-editable help application, the help log corresponding to an operation related to a computer application;

in response to a second single action, providing a user-defined help message to a database, the user-defined help message comprising information related to the operation and addressing a recorded problem encountered in using said computer application by providing information for eliminating or reducing said problem;

rendering the user-defined help message according to a creation time in the help log;

providing a display image including said help message and enabling a user to retrieve an additional document associated with a particular help message from said database;

automatically parsing a help message and creating a link for retrieving said additional document by converting text into a hyperlink and inserting said hyperlink in a help message; and providing a search function.

24. The method according to claim 23, further comprising:

displaying a link representative item in said help message enabling a user to retrieve said additional document and enabling a user to retrieve help message information from said database sorted by creation time; and providing a confirmation of a posting of the help message.

25. The method according to claim 23, further comprising:

automatically parsing a help message and creating a link for retrieving said additional document by converting text into a hyperlink and inserting said hyperlink in a help message; and providing a search function.

26. The method according to claim 23, further comprising:

providing a preview of the user-defined help message.

27. A method, comprising the activities of:

via a first single action, accessing a help log comprised by a user-editable help application, the help log corresponding to an operation related to a computer application;

via a second single action, providing a user-defined help message to the user-editable help application, the user-defined help message comprising information related to the operation and addressing a recorded problem encountered in using said computer application by providing information for eliminating or reducing said problem;

displaying the user-defined help message according to a creation time in the help log;

enabling a user to retrieve an additional document associated with a particular help message from said database;

automatically parsing a help message and creating a link for retrieving said additional document by converting text into a hyperlink and inserting said hyperlink in a help message; and providing a search function.

28. The method according to claim 27, wherein the help log comprises at least one of: organization information, employee information, policy information, and procedure information.

29. The method according to claim 27, wherein the user-defined help message comprises at least one of: organization information, employee information, policy information, and procedure information.

* * * * *